US009267780B2

(12) United States Patent
Abe

(10) Patent No.: US 9,267,780 B2
(45) Date of Patent: Feb. 23, 2016

(54) THREE-DIMENSIONAL SHAPE MEASUREMENT SYSTEM AND SOFTWARE FOR CONTROLLING THE SAME

(71) Applicant: MITUTOYO CORPORATION, Kawasaki-shi, Kanagawa (JP)

(72) Inventor: Shinsaku Abe, Iwamizawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 86 days.

(21) Appl. No.: 14/303,261

(22) Filed: Jun. 12, 2014

(65) Prior Publication Data

US 2015/0000148 A1 Jan. 1, 2015

(30) Foreign Application Priority Data

Jun. 27, 2013 (JP) ................................. 2013-135571

(51) Int. Cl.
*G01B 5/008* (2006.01)
*G01B 5/207* (2006.01)
*G01B 11/245* (2006.01)

(52) U.S. Cl.
CPC ................ *G01B 5/008* (2013.01); *G01B 5/207* (2013.01); *G01B 11/245* (2013.01); *G01B 2210/52* (2013.01)

(58) Field of Classification Search
CPC ..... G01B 5/008; G01B 5/207; G01B 2210/52
USPC .......................................... 33/503, 557, 560
See application file for complete search history.

(56) References Cited

U.S. PATENT DOCUMENTS

| 5,579,246 | A * | 11/1996 | Ebersbach | G01B 21/045 33/503 |
|---|---|---|---|---|
| 5,726,917 | A * | 3/1998 | Staaden | G05B 19/4103 33/503 |
| 6,879,933 | B2 * | 4/2005 | Steffey | G01B 11/005 33/503 |
| 2010/0269362 | A1 * | 10/2010 | Bos | G01B 5/0002 33/503 |
| 2011/0119025 | A1 * | 5/2011 | Fetter | G01B 5/008 702/152 |
| 2013/0054176 | A1 * | 2/2013 | Pedigo | B64F 5/0045 702/108 |
| 2015/0041094 | A1 * | 2/2015 | Yoshimura | G01B 5/008 164/4.1 |
| 2015/0233692 | A1 * | 8/2015 | Nakagawa | G01B 5/016 33/503 |

FOREIGN PATENT DOCUMENTS

JP A-2009-529132 8/2009

* cited by examiner

*Primary Examiner* — G. Bradley Bennett
(74) *Attorney, Agent, or Firm* — Oliff PLC

(57) ABSTRACT

A three-dimensional shape measurement system includes a three-dimensional shape measuring machine that outputs spatial coordinate data on a probe for measuring a work, and a control PC that processes the spatial coordinate data. The three-dimensional shape measurement machine includes a plurality of articulated-armed three-dimensional shape measuring machines that are arranged so that measurement ranges of the probes overlap each other to allow measurement of part or all of the work, and configured such that each can output spatial coordinate data. The control PC includes a coordinate data pool that retains the spatial coordinate data in an identifiable manner with respect to each of the three-dimensional shape measuring machines, and a synthesis unit that synthesizes the spatial coordinate data retained in the coordinate data pool.

10 Claims, 10 Drawing Sheets

THREE-DIMENSIONAL SHAPE MEASUREMENT SYSTEM AND SOFTWARE FOR CONTROLLING THE SAME

CROSS-REFERENCE TO RELATED APPLICATION

The disclosure of Japanese Patent Application No. 2013-135571 filed on Jun. 27, 2013 including specifications, drawings and claims is incorporated herein by reference in its entirety.

TECHNICAL FIELD

The present invention relates to a three-dimensional shape measurement system and software for controlling the same. In particular, the present invention relates to a single three-dimensional shape measurement system that can quickly measure a large work exceeding a measurement range of a three-dimensional shape measuring machine at low cost, and software for controlling the same.

BACKGROUND ART

In order to measure a large work exceeding the measurement range of a single (general-purpose) three-dimensional shape measuring machine, it has heretofore been proposed to prepare a plurality of installation positions for the three-dimensional shape measuring machine around the large work, as described in Japanese Translation of PCT Application Publication No. 2009-529132 (hereinafter, Patent Literature 1). It has been proposed that the three-dimensional shape measuring machine is successively moved to the installation positions to measure the entire work. Such a technique can be used to measure a work of considerable size at minimum cost. Suppose that there are four installation positions. According to the technique, the three-dimensional shape measuring machine measures spatial coordinate data on the measurement range (zone) in each installation position before the spatial coordinate data of the four zones is synthesized into the same coordinate system. The three-dimensional shape measuring machine includes a probe for measuring a work. The probe is moved by manual operations, and the three-dimensional shape measuring machine outputs the spatial coordinate data on the probe.

SUMMARY OF INVENTION

Technical Problem

The technique described in Patent Literature 1 has the following problems. One of the problems is a long measurement time because the three-dimensional shape measuring machine is moved a plurality of times to perform measurements in order, with installation, measurement preparations, and adjustment each time. Another problem is poor measurement reproducibility and difficulty in performing remeasurement because a single three-dimensional shape measuring machine is used for a plurality of installation positions, which inevitably causes reproducibility errors in the installation positions of the three-dimensional shape measuring machine.

The present invention has been made in order to solve the above-described problems, and an object thereof is to provide a three-dimensional shape measurement system and software for controlling the same which can quickly measure a large work exceeding the measurement range of a single three-dimensional shape measuring machine at low cost.

Solution to Problem

To solve the foregoing problems, the invention according to a first embodiment of the present application provides a three-dimensional shape measurement system including a three-dimensional shape measuring machine that outputs spatial coordinate data on a probe for measuring a work, and a processing unit that processes the spatial coordinate data, the three-dimensional shape measurement machines including a plurality of three-dimensional shape measuring machines of articulated arm type that are arranged so that measurement ranges of the probes overlap each other to allow measurement of part or all of the work and configured such that each can output the spatial coordinate data, the processing unit including retaining means for retaining the spatial coordinate data in an identifiable manner with respect to each of the three-dimensional shape measuring machines, and synthesizing means for synthesizing the spatial coordinate data retained by the retaining means.

The invention according to a second embodiment of the present application is configured such that the processing unit further includes interference checking means for checking an approaching state between the probes on the basis of the spatial coordinate data, and outputting means for outputting check information determined by the interference checking means.

The invention according to a third embodiment of the present application is configured such that the check information is a collision warning.

The invention according to a fourth embodiment of the present application is configured such that the collision warning is output to all the three-dimensional shape measuring machines.

The invention according to a fifth embodiment of the present application is configured such that the synthesizing means determines corrected spatial coordinate data in an area where the measurement ranges overlap, on the basis of the mutually corresponding pieces of spatial coordinate data of the three-dimensional shape measuring machines, and synthesizes the corrected spatial coordinate data.

The invention according to a sixth embodiment of the present application is configured such that the processing unit includes data accepting means for adding a measurement flag to the spatial coordinate data when the work is being measured, the data accepting means being arranged in a stage prior to the synthesizing means, and the synthesizing means synthesizes only the spatial coordinate data to which the measurement flag is added.

The invention according to a seventh embodiment of the present application is configured such that the data accepting means adds a movement flag when the probe is simply moving.

The invention according to a eighth embodiment of the present application is configured such that the processing unit includes a plurality of processing units arranged to correspond to the respective three three-dimensional shape measuring machines.

The invention according to a ninth embodiment of the present application is configured such that the processing unit is one and common to the three-dimensional shape measuring machines.

The invention according to a tenth embodiment of the present application provides software for controlling a three-dimensional shape measurement system, the three dimensional shape measurement system including a three-dimensional shape measuring machine that outputs spatial coordinate data on a probe for measuring a work, and a processing unit that processes the spatial coordinate data, the three-dimensional shape measurement machine including a plurality of three-dimensional shape measuring machines of articulated arm type that are arranged so that measurement ranges of the probes overlap each other to allow measurement of part or all of the work and configured such that each can output the spatial coordinate data, the software being configured to cause the processing unit to perform processing for retaining the spatial coordinate data in an identifiable manner with respect to each of the three-dimensional shape measuring machines, and processing for synthesizing the retained spatial coordinate data.

Advantageous Effects of Invention

According to the present invention, a large work exceeding the measurement range of a single three-dimensional shape measuring machine can be quickly measured at low cost.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described in detail below with reference to the drawings.

A first embodiment of the present invention will be described with reference to FIGS. 1 to 6.

A configuration of a three-dimensional shape measurement system 100 according to the present embodiment will initially be described.

Figure 1:
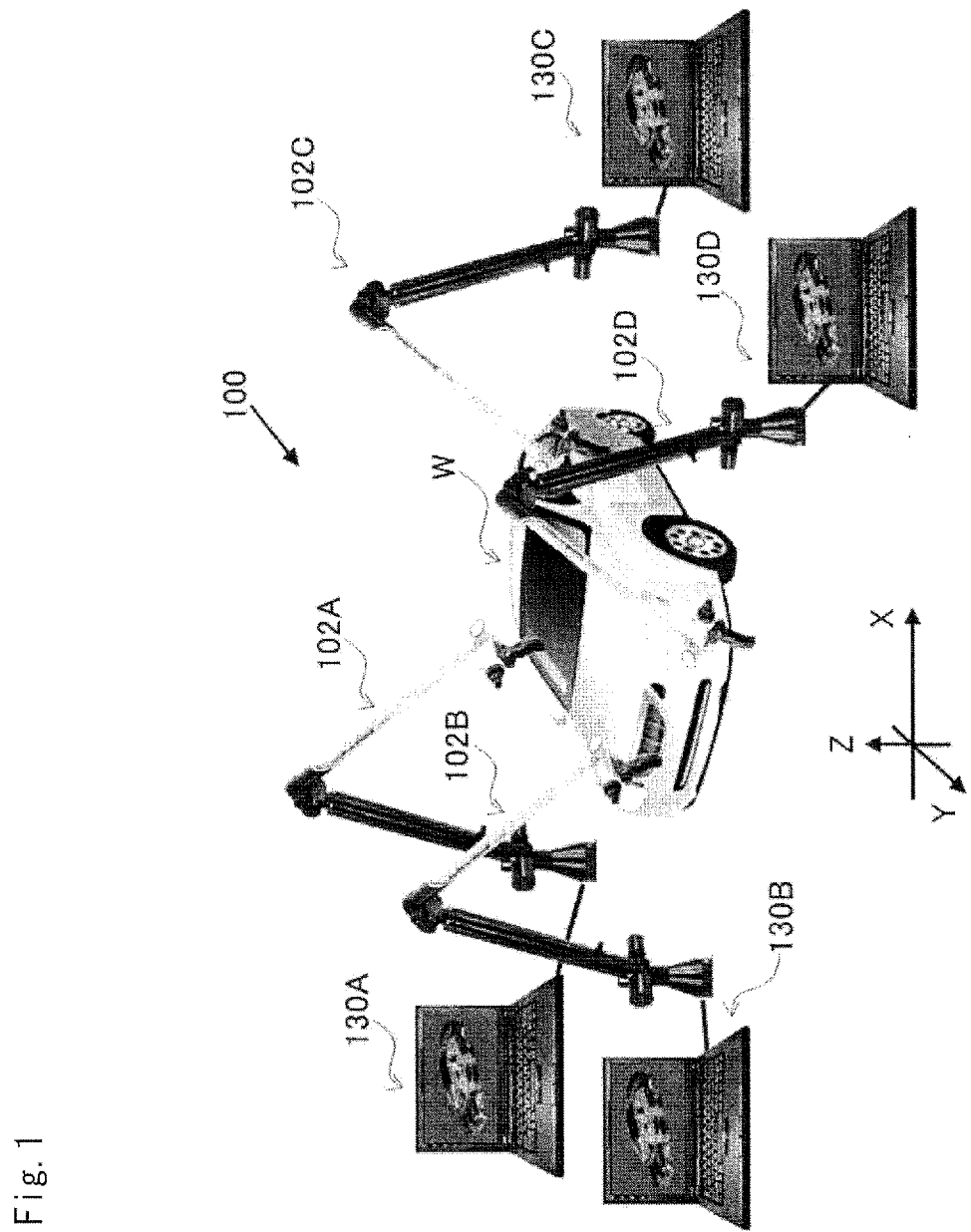
FIG. 1 is a schematic diagram showing an example of a three-dimensional shape measurement system according to a first embodiment of the present invention.
Figure 2:
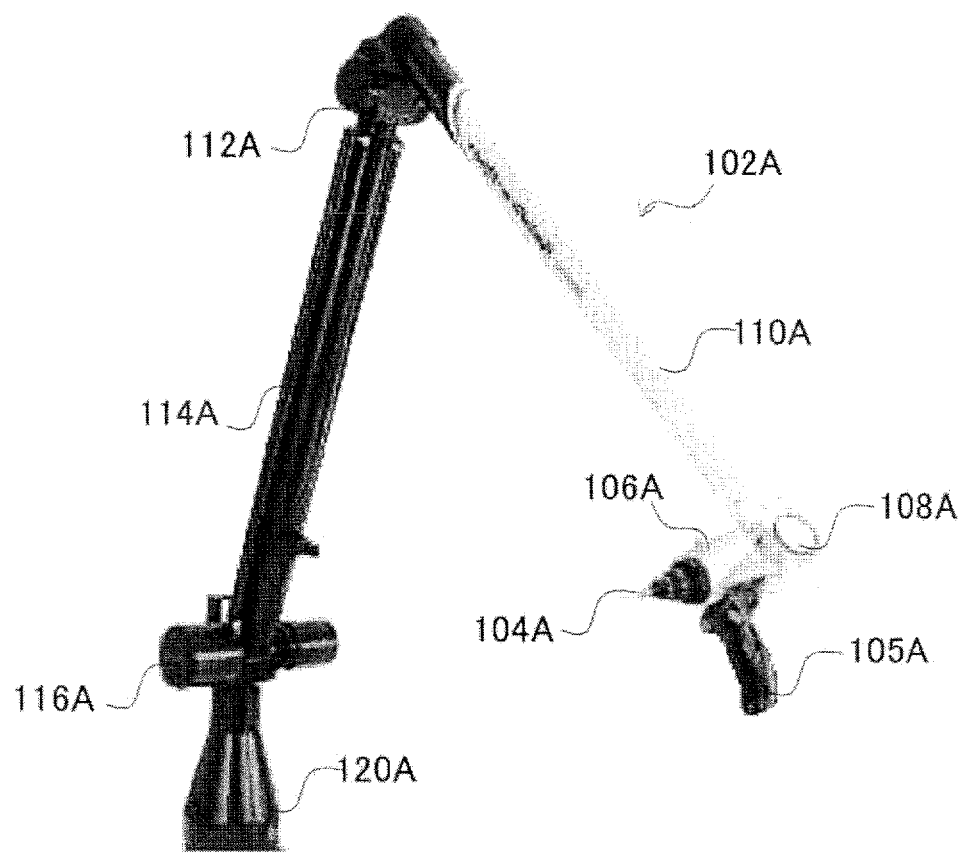
FIG. 2 is a schematic diagram showing an example of a three-dimensional shape measuring machine of FIG. 1.

As shown in FIG. 1, the three-dimensional shape measurement system 100 includes a plurality of three-dimensional shape measuring machines 102 (102A to 102D) and control computers (processing units or control PCs) 130 (130A to 130D). In the present embodiment, a work W is a large work that exceeds the measurement range of a single three-dimensional shape measuring machine. The work W is a vehicle body (a clay model, a welded prototype, a revised article, an initial lot product, etc.) such as shown in FIG. 1. The work W may be an even bigger structure (for example, a frame component of a ship, an aircraft, or the like).

As shown in FIG. 1, the three-dimensional shape measuring machines 102A to 102D are a plurality (four, in FIG. 1) of general-purpose (simplified) coordinate measuring machines of articulated arm type. The four three-dimensional shape measuring machines 102A to 102D are arranged on a not-shown base so that the measurement ranges (zones) of probes 104A to 104D (to be described later) partly overlap each other to allow measurement of the entire work W (which is not restrictive, and only part of the work W may be measurable). The reason for such an arrangement of the three-dimensional shape measuring machines 102A to 102D is that when measuring a large work W, point and line elements need to be measured over wide ranges of the work W in order to improve the setting accuracy of the same coordinate system. Since all the four three-dimensional shape measuring machines 102A to 102D are identical, one of the three-dimensional shape measuring machines, 102A, will be described below with reference to FIG. 2. Note that all the four three-dimensional shape measuring machines need not necessarily be identical. Two or more may be identical. All the four may be of different models.

The three-dimensional shape measuring machine 102A includes a support 120A which is perpendicularly erected on the not-shown base. The support 120A and an end of a second arm 114A are connected via a third joint 116A. The third joint 116A includes a built-in rotary encoder (not shown) that can rotate with respect to two axial directions and detect the respective rotation angles. The other end of the second arm 114A and an end of a first arm 110A are connected via a second joint 112A which is similar to the third joint 116A. The other end of the first arm 110A and a probe head 106A are connected via a first joint 108A which is similar to the second joint 112A. The probe 104A is arranged at the end of the probe head 106A. The probe 104A is a contact ball probe having a ball at its end. Although not shown, the third joint 116A includes a built-in electromagnetic brake (not necessarily electromagnetic). For example, the electromagnetic brake is configured to be released to allow free movement of the probe head 106A while an operator grips a grip 105A arranged on the probe head 106A. When the operator releases the grip 105A, the electromagnetic brake functions to regulate the movement of the probe head 106A. The electromagnetic brake may be further controlled by instructions from the control PC 130A. All the joints may include electromagnetic brakes.

The lengths of and the positional relationship between the probe 104A, the probe head 106A, the first and second arms 110A and 114A, and the support 120A are known in advance. When the center coordinate values of the ball of the probe 104A are measured, offset processing as much as the radius of the ball can be performed on the center coordinate values of the ball to accurately measure the contact position between the ball and the work W. As a result, the end position of the probe 104A for measuring the work W in the coordinate system with respect to the base can be accurately determined on the basis of the outputs of the rotary encoders built in the first to third joints 108A, 112A, and 116A. In other words, the three-dimensional shape measuring machine 102A can output accurate spatial coordinate data on (the end of) the probe 104A according to the outputs of the rotary encoders. When measuring the three-dimensional shape of the work W with the three-dimensional shape measuring machine 102A, the operator grips the grip 105A of the probe head 106A for operation. The operator can bring the probe 104A close to the work W in any direction and into contact with the work W at any angle. The four three-dimensional shape measuring machines 102A to 102D, when operated by respective operators, can output spatial coordinate data at the same time (which is not restrictive, and the three-dimensional shape measuring machines do not need to output spatial coordinate data at the same time).

As shown in FIG. 1, the four control computers (control PCs) 130A to 130D are connected to the corresponding three-dimensional shape measuring machines 102A to 102D, respectively. The control PCs 130A to 130D process the spatial coordinate data output from the three-dimensional shape measuring machines 102A to 102D. Since all the four control PCs 130A to 130D are identical, one of the control PCs, 130A, will be described below.

Figure 3:
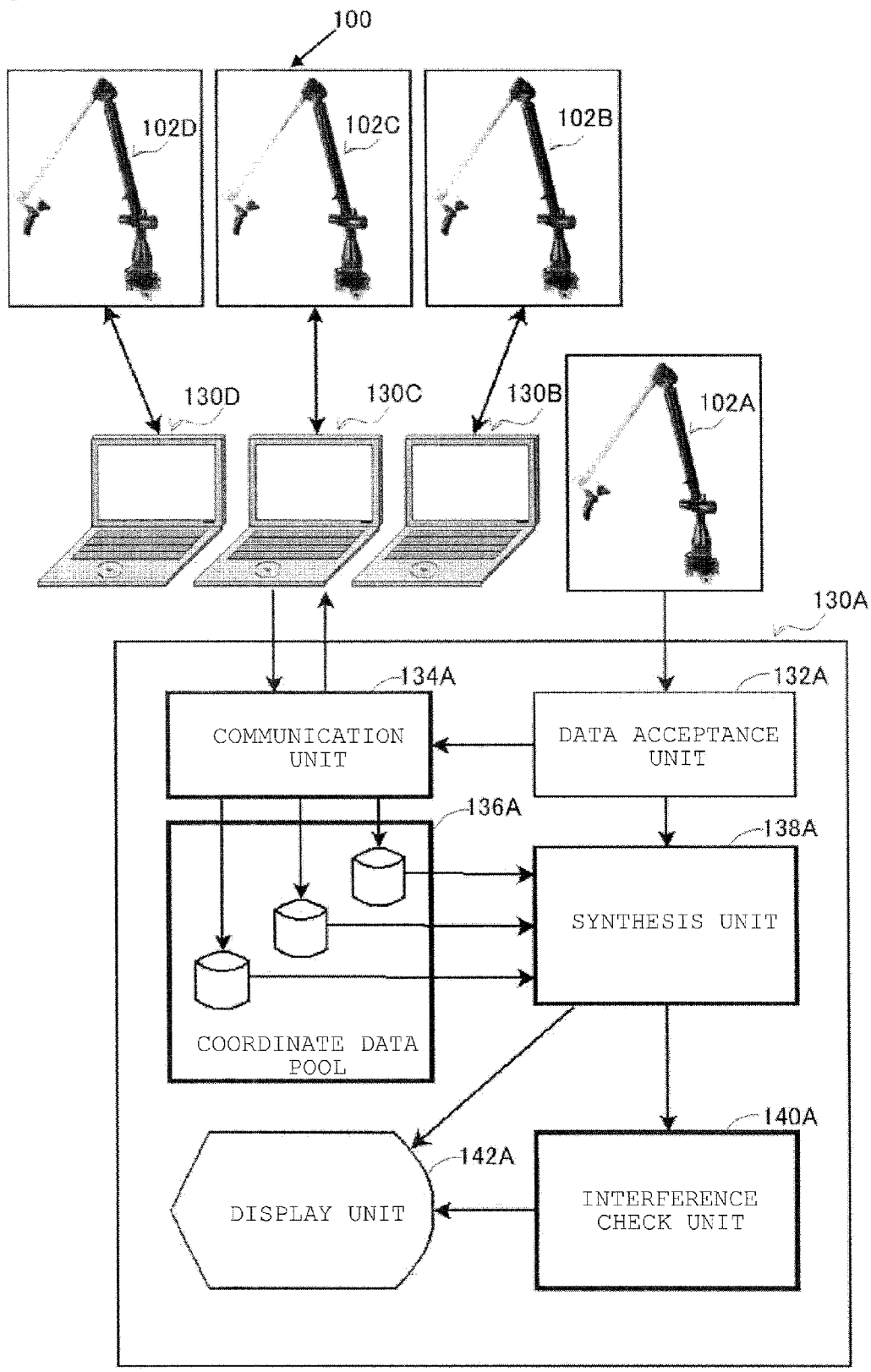
FIG. 3 is a schematic diagram showing an example of an entire block diagram of FIG. 1.

As shown in FIG. 3, the control PC 130A includes a data acceptance unit (data accepting means) 132A, a communication unit 134A, a coordinate data pool (retaining means) 136A (all coordinate data pools will be denoted by the reference numeral 136), a synthesis unit (synthesizing means) 138A (all synthesis units will be denoted by the reference numeral 138), an interference check unit (interference checking means) 140A, and a display unit (outputting means) 142A.

The data acceptance unit 132A is connected to the three-dimensional shape measuring machine 102A. The data acceptance unit 132A can directly accept the spatial coordinate data output from the three-dimensional shape measuring machine 102A. When the probe 104A is measuring the work W, a measurement flag is added to the spatial coordinate data accepted by the data acceptance unit 132A. When the probe 104A is simply moving, a movement flag is added to the accepted spatial coordinate data. The accepted spatial coordinate data is stored in a dedicated coordinate data pool in the data acceptance unit 132A. The control PC 130A recognizes information about the three-dimensional shape measuring machine 102A (measuring machine information) upon startup. The data acceptance unit 132A thereby identifies the spatial coordinate data output from the three-dimensional shape measuring machine 102A as that of the three-dimensional shape measuring machine 102A. The acceptance of the spatial coordinate data is stopped according to a stop instruction from a not-shown input unit or a stop instruction from the other control PCs 130B to 130D (via the communication unit 134A). The "stop instruction" is issued if measurement becomes unable to be continued because of a breakdown, a trouble, or because the operator decides to pause. In such cases, for example, the display units 142A to 142D of all the control PCs 130A to 130D may display of the stop, and the measurement may be automatically put on standby.

The communication unit 134A transmits untransmitted spatial coordinate data to the other control PCs 130B to 130D and receives spatial coordinate data from the other control PCs 130B to 130D via a communication device of the control PC 130A by multithread processing. More specifically, the communication unit 134A can add the measuring machine information (identification number) of the three-dimensional shape measuring machine 102A to the spatial coordinate data output from the data acceptance unit 132A, to which the movement or measurement flag has been added, and transmit the resultant to the other control PCs 130B to 130D. The communication unit 134A can receive the spatial coordinate data transmitted from the other control PCs 130B to 130D, to which the identification numbers allowing recognition of the measuring machine information about the three-dimensional shape measuring machines 102B and 102D have been added along with the movement or measurement flag. The communication unit 134A can also transmit a stop instruction input from the input unit to the other control PCs 130B to 130D, and receive stop instructions transmitted from the other control PCs 130B to 130D. The coordinate data pool 136A is connected to the communication unit 134A.

The coordinate data pool 136A can retain the movement- or measurement-flagged spatial coordinate data of the three-dimensional shape measuring machines 102B to 102D from the communication unit 134A. In this case, the coordinate data pool 136A can retain the spatial coordinate data in an identifiable manner with respect to each of the three-dimensional shape measuring machines 102B to 102D (by using the measuring machine information). The coordinate data pool 136A may also be connected to the data acceptance unit 132A. The coordinate data pool 136A may retain the spatial coordinate data (in which the measuring machine information about the three-dimensional shape measuring machine 102A is made recognizable and to which the movement or measurement flag is added) past the data acceptance unit 132A.

The synthesis unit 138A is connected subsequent to the data acceptance unit 132A and the coordinate data pool 136A. The synthesis unit 138A synthesizes the spatial coordinate data retained by the coordinate data pool 136A and the spatial coordinate data output from the data acceptance unit 132A into the same coordinate system. The synthesis unit 138A includes a memory space, in which the movement- or measurement-flagged spatial coordinate data having different measuring machine information retained by the coordinate data pool 136A and the spatial coordinate data of the data acceptance unit 132A are loaded into the same coordinate system.

Using the different measuring machine information, the synthesis unit 138A determines corrected spatial coordinate data in the areas where the measurement ranges of the probes 104A to 104D overlap each other, on the basis of the mutually corresponding pieces of spatial coordinate data of the three-dimensional shape measuring machines 102A to 102D (stitching function). The synthesis unit 138A then synthesizes the determined corrected spatial coordinate data in succession. An example of the stitching function will be described. Given an overlapping area where two measurement ranges overlap each other, the synthesis unit 138A initially determines errors between the two mutually corresponding pieces of spatial coordinate data in a plurality of positions within the overlapping area. The synthesis unit 138A then regularly moves the two pieces of spatial coordinate data in X, Y, and Z directions to minimize the errors. The synthesis unit 138A corrects the spatial coordinate data in the overlapping area with the amount of the movement so that the pieces of spatial coordinate data coincide with each other. In such a manner, the synthesis unit 138A can determine corrected spatial coordinate data based on the two pieces of spatial coordinate data. Note that the stitching function is not limited thereto. The two mutually corresponding pieces of spatial coordinate data may be simply averaged to determine corrected spatial coordinate data. Either one of the two mutually corresponding pieces of spatial coordinate data may be employed as corrected spatial coordinate data.

The interference check unit 140A is connected to the synthesis unit 138A. The interference check unit 140A simultaneously checks the positional relationship between all the three-dimensional shape measuring machines 102A to 102D in succession for a collision risk. The pieces of spatial coordinate data to be checked here are those having respective different measuring machine information. The interference check unit 140A checks an overlapping or approaching state irrespective of the measurement flag or the movement flag. In other words, the interference check unit 140A checks the approaching state between the probes 104A to 104D on the basis of the spatial coordinate data irrespective of whether the probes 104A to 104D are measuring. Specifically, a maximum distance (setting distance) at which (the ends of) the probes 104A to 104D may possibly collide with each other is determined in advance. The interference check unit 140A determines the interference state between the three-dimensional shape measuring machines 102A to 102D depending on whether a difference between the pieces of spatial coordinate data having different measuring machine information falls below the setting distance. In FIG. 3, the interference check unit 140A is connected subsequent to the synthesis unit 138A. Like the synthesis unit 138A, the interference check unit 140A may be connected to the data acceptance unit 132A and the coordinate data pool 136A.

The display unit 142A is connected to the synthesis unit 138A and the interference check unit 140A. The display unit 142A can successively display the spatial coordinate data synthesized by the synthesis unit 138A in a two- or three-dimensional configuration. The display unit 142A can also output check information determined by the interference check unit 140A. More specifically, if there is a risk that the probes 104A to 104D may collide with each other, a warning is displayed on the display unit 142A. In the present embodiment, if the probe 104A connected to this control PC 130A and any one of the other probes 104B to 104D are at risk of collision, the display unit 142A displays a warning (the display units 142B to 142D of the control PCs 130B to 130D connected to the probes 104B to 104D also display the warning). For example, the display unit 142A successively updates and displays all the spatial coordinate data and the images of all the three-dimensional shape measuring machines 102A to 102D or those of all the probes 104A to 104D (to be described later) (the same applies to the other control PCs 130B to 130D). The warning is issued from all the control PCs 130A to 130D, by displaying the images of the three-dimensional shape measuring machines to be warned in a flash display or by displaying the distance between the probes of the three-dimensional shape measuring machines to be warned. Displaying the warning on all the control PCs makes it possible for an operator who is operating a control PC not to be warned to recognize the warning and alert the operators to be warned. It should be appreciated that the warning display is not limited thereto, and may be display only on the intended control PCs. The intended control PCs and the ones not may issue warnings of different levels. The control PC 130A may include a speaker, and output an alarm (including a voice message) at the same time. The control PC 130A can include a not-shown input unit, and input various measurement conditions, display conditions, measurement stop instructions, etc.

In such a manner, all the control PCs 130A to 130D are connected to each other and communicate with each other via the communication devices of the control PCs 130A to 130D. The spatial coordinate data measured by the three-dimensional shape measuring machines 102A to 102D is processed by the respective connected control PCs 130A to 130D. At the same time, the spatial coordinate data is transmitted to the other control PCs 130A to 130D. The measured spatial coordinate data and the received spatial coordinate data in the control PCs 130A to 130D are simultaneously synthesized and displayed on the respective display units 142A to 142D. That is, the synthesis results in all the communication-connected control PCs 130A to 130D are retained in the same display state by the display units 142A to 142D. Consequently, if one of the three-dimensional shape measuring machines, 102A (102B to 102D), needs remeasurement, the one three-dimensional shape measuring machine 102A (102B to 102D) can simply perform the remeasurement without special settings. The resulting spatial coordinate data is then shared by all the control PCs 130A to 130D, and the same synthesis result can be updated and displayed on all the display units 142A to 142D.

The control PCs 130A to 130D can each perform all the functions by parallel processing (multitask processing). The spatial coordinate data on the probes 104A to 104D can thus be processed to update the display state of the display units 142A to 142D at regular time intervals. The display of the display units 142A to 142D may be modified without deteriorating the viewability of the display of the synthesis result. For example, the shapes of the three-dimensional shape measuring machines 102A to 102D (images including the shapes of the probes 104A to 104D as well as those of the arms 110A to 110D and 114A to 114D) may be rendered semi-transparent and simultaneously updated.

Figure 4:
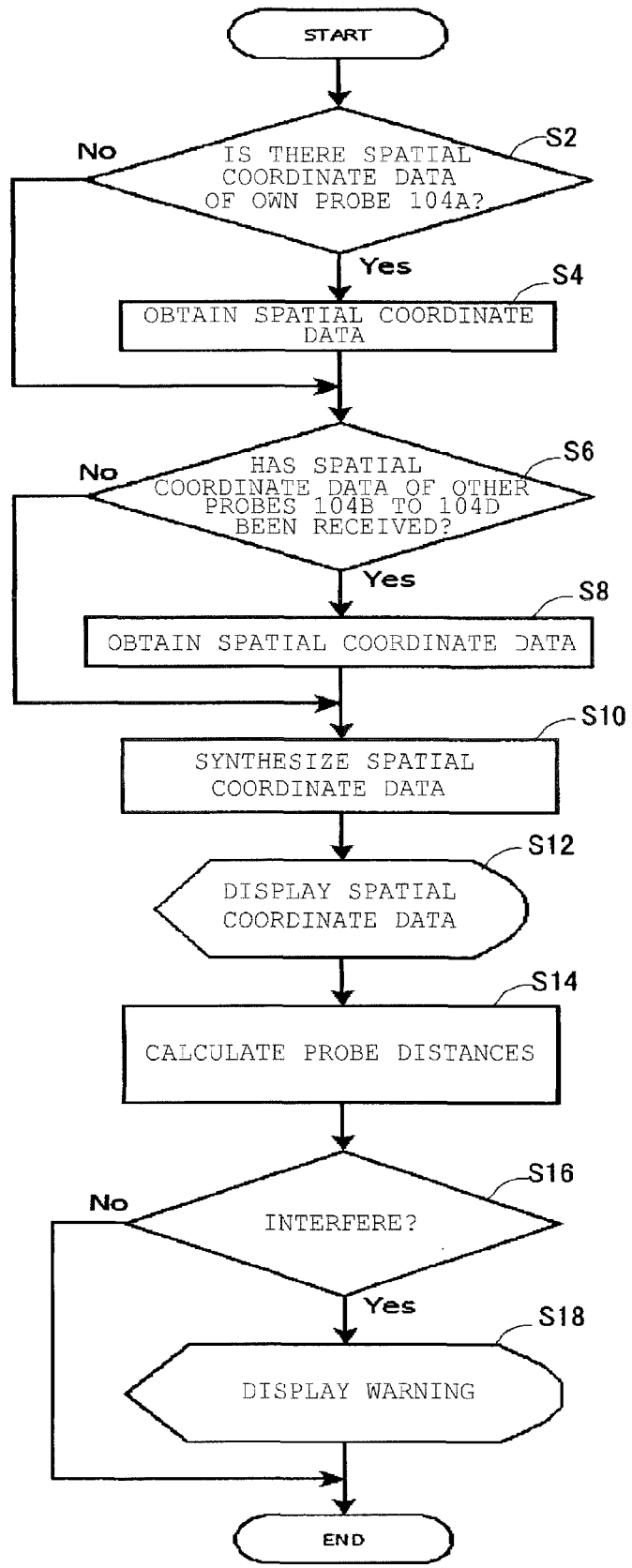
FIG. 4 is a flowchart showing a procedure of main processing of spatial coordinate data by a control computer of FIG. 1.
Figure 5:
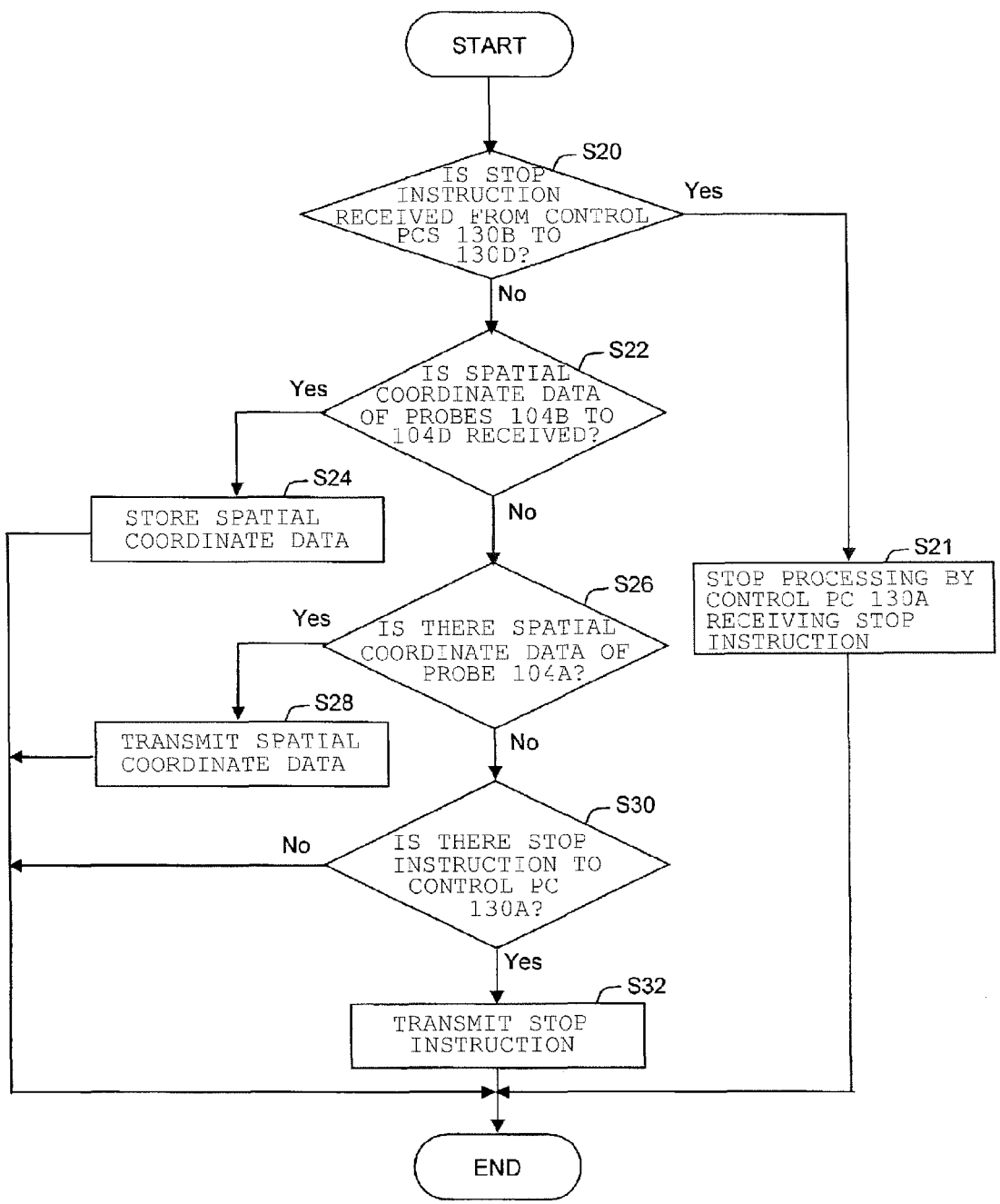
FIG. 5 is a flowchart mainly showing a procedure of processing in a stage prior to the main processing shown in FIG. 4.
Figure 6:
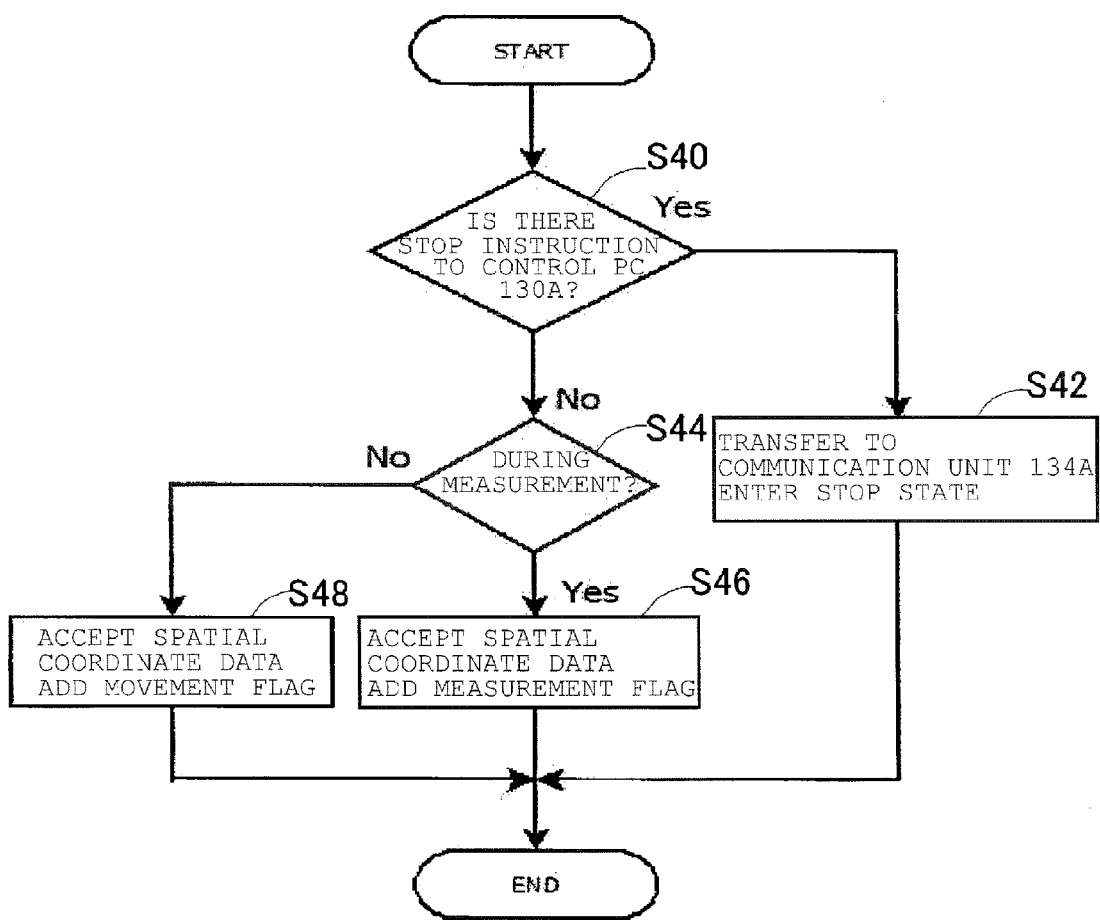
FIG. 6 is a flowchart mainly showing a procedure of processing in a stage still prior to the prior stage shown in FIG. 5.

Next, an example of processing procedures to be performed by the control PC 130A of the three-dimensional shape measurement system 100 according to the present embodiment will be described below with reference to FIGS. 4 to 6. FIG. 4 shows processing that is mainly performed by the coordinate data pool 136A, the synthesis unit 138A, the interference check unit 140A, and the display unit 142A of FIG. 3. FIG. 5 shows processing that is mainly performed by the communication unit 134A and the coordinate data pool 136A. FIG. 6 shows a processing procedure that is mainly performed by the data acceptance unit 132A. Such processing procedures are simultaneously performed by parallel processing (multitask processing). Since the processing procedures of the control PCs 130B to 130D are the same as those of the control processing 130A, a description thereof will be omitted.

The processing of FIG. 6 will be initially described. The processing is performed when the data acceptance unit 132A is requested to accept spatial coordinate data.

Initially, the data acceptance unit 132A determines whether a stop instruction is input from the not-shown input unit of the control PC 130A. If a stop instruction is input (Yes in step S40), the data acceptance unit 132A transfers the stop instruction to the communication unit 134A so that the stop instruction is transmitted to the other control PCs 130B to 130D. The data acceptance unit 132A further performs processing for shifting the execution state of the control PC 130A into a stop state (step S42).

If no stop instruction is input (No in step S40), the data acceptance unit 132A determines whether the spatial coordinate data input to the data acceptance unit 132A is measurement data on the work W.

If the spatial coordinate data is measurement data on the work W (Yes in step S44), the data acceptance unit 132A accepts the spatial coordinate data and adds the measurement flag to the spatial coordinate data (step S46). If the spatial measurement data is not measurement data on the work W but output data when the probe 104A is simply being moved (No in step S44), the data acceptance unit 132A accepts the spatial coordinate data and adds the movement flag to the spatial coordinate data (step S48). In either case, the spatial coordinate data is configured such that the measuring machine information about the three-dimensional shape measuring machine 102A can be recognized.

Next, the processing of FIG. 5 will be described. This processing is performed simultaneously with the processing procedure shown in FIG. 4, but faster than the output intervals of the spatial coordinate data output from the three-dimensional shape measuring machine 102A.

Initially, the communication unit 134A determines whether a stop instruction is received from a control PC 130B to 130D. If a stop instruction is received (Yes in step S20), the control PC 130A receiving the stop instruction performs stop processing (step S21). The stop processing includes processing for disabling the measurement associated with the control PC that has issued the stop instruction. The control PC 130A then waits for the control PC having issued the stop instruction to return. In the meantime, the communication unit 134A continues receiving the spatial coordinate data from the control PCs that have not issued the stop instruction. The communication unit 134A also continues transmitting the spatial coordinate data of the control PC 130A even to the control PC that has issued the stop instruction. To check the interference state between the three-dimensional shape measuring machines 102A to 102D, the communication unit 134A may continue receiving the movement-flagged spatial coordinate data from the control PC that has issued the stop instruction, depending on the level of the stop instruction (a state where measurement is temporarily suspended, a state where the entire three-dimensional shape measuring machine is suspended, the end of the control software, or the like).

If the received data is not a stop instruction (No in step S20), then the communication unit 134A determines whether spatial coordinate data of the probes 104B to 104D is received. If spatial coordinate data is received (Yes in step S22), the communication unit 134A retains (stores) the spatial coordinate data in the coordinate data pool 136A (step S24). Note that either the measurement flag or the movement flag and the measuring machine information have been added to the spatial coordinate data before the reception by the control PC 130A (see FIG. 6).

If no spatial coordinate data is received (No in step S22), then the communication unit 134A determines whether there is spatial coordinate data of the probe 104A in the data acceptance unit 132A. If there is spatial coordinate data (Yes in step S26), the communication unit 134A adds the measuring machine information (identification number) about the three-dimensional shape measuring machine 102A to the spatial coordinate data. The communication unit 134A transmits the resulting spatial coordinate data to the other control PCs 130B to 130D (step S28). Note that either the measurement flag or the movement flag has been added to the spatial coordinate data (see steps S46 and S48).

If there is no spatial coordinate data (No in step S26), then the control PC 130A determines whether a stop instruction is input from the input unit. If no stop instruction is input from the input unit (No in step S30), the control PC 130A ends the processing. If a stop instruction is input from the input unit (Yes in step S30), the communication unit 134A transmits the stop instruction to the other control PCs 130B to 130D (step S32).

Next, the processing of FIG. 4 will be described. This processing is also performed faster than the output intervals of the spatial coordinate data output from the three-dimensional shape measuring machine 102A.

Initially, the control PC 130A determines whether there is spatial coordinate data of the probe 104A in the data acceptance unit 132A. If there is spatial coordinate data of the probe 104A (Yes in step S2), the control PC 130A obtains and loads the spatial coordinate data into the memory of the synthesis unit 138A (step S4).

Next, the control PC 130A determines whether there is spatial coordinate data of the probes 104B to 104D in the coordinate data pool 136A (the processing also proceeds to the same step if there is no spatial coordinate data of the probe 104A (No in step S2)). If there is spatial coordinate data of the probes 104B to 104D (Yes in step S6), the control PC 130A obtains and loads the spatial coordinate data into the memory of the synthesis unit 138A (step S8).

Next, the synthesis unit 138A analyzes all the spatial coordinate data loaded in its memory at a time, and synthesizes only spatial coordinate data to which the measurement flag has been added (step S10). Here, the synthesis unit 138A uses the foregoing stitching function to determine corrected spatial coordinate data on the basis of the mutually corresponding pieces of spatial coordinate data of the three-dimensional shape measuring machines 102A to 102D in the areas where the measurement ranges overlap. The synthesis unit 138A synthesizes the corrected spatial coordinate data into the same coordinate system. In areas where the measurement ranges (zones) do not overlap, the synthesis unit 138A also determines corrected spatial coordinate data similar to that of the areas where the measurement ranges overlap, and synthesizes the corrected spatial coordinate data into the same coordinate system.

Next, the display unit 142A displays the synthesized spatial coordinate data (step S12). Here, the movement-flagged spatial coordinate data is displayed separately from the synthesized spatial coordinate data (or need not be displayed). For example, the movement-flagged spatial coordinate data may be displayed as moving tracks of the probes 104A to 104D. The synthesized measurement-flagged spatial coordinate data may be displayed in different modes (in different display colors etc.) according to the different measuring machine information.

Next, the interference check unit 140A calculates the distances between the probes 104A to 104D (step S14). The interference check unit 140A then determines whether the calculated distances are smaller than the setting distance. If a calculated distance is smaller than the setting distance (YES in step S16), the display unit 142A displays a warning (step S18). For example, the display units 142A to 142D display all the spatial coordinate data and the images of all the three-dimensional shape measuring machines 102A to 102D or those of all the probes 104A to 104D. If two of the probes of the three-dimensional shape measuring machines approach closer than the setting distance, the display units 142A to 142D may make the images of the two three-dimensional shape measuring machines or those of the two probes flash out for warning display. Alternatively, the display units 142A to 142D may display a warning by changing the display mode (such as blinking and reversing display) of only the portions that may cause interference. It should be appreciated that an alarm or the like may be issued along with the warning display. In addition to such a warning display, the electromagnetic brake(s) of the three-dimensional shape measuring machine 102A may be controlled to regulate the movement of the three-dimensional shape measuring machine 102A. If the calculated distances are greater than the setting distance (No in step S16), the interference check unit 140A ends the processing without a warning display.

As described above, according to the present embodiment, the control PCs 130A to 130D are connected to the corresponding three-dimensional shape measuring machines 102A to 102D, and can provide the same display of the measurement statuses on the display units 142A to 142D. As a result, the operators can appropriately place the control PCs 130A to 130D near the respective operators, and can simultaneously check the entire measurement statuses (including the synthesized result and its analysis result) as appropriate for efficient measurement.

According to the conventional technique, it takes a long time to simply measure the entire work W. In addition, synthesis and analysis cannot be performed until the completion of the measurement. In contrast, according to the present embodiment, the spatial coordinate data measured by the four three-dimensional shape measuring machines 102A to 102D can be shared in a successive manner. More specifically, the measurement results of the three-dimensional shape measuring machines 102A to 102D can be processed as if they are obtained by a single three-dimensional shape measuring machine. This enables operations that have been impossible during measurement according to the conventional technique. For example, the measurement results can be immediately used to evaluate and create an identical large coordinate system or datum (reference) over the entire work W for measurement. This significantly reduces the labor for making measurement preparations such as copying data and setting the created same coordinate system for all the three-dimensional shape measuring machines 102A to 102D, whereby usability can be improved. For example, if the work W is a vehicle body and the tilt from the front to the tail of the vehicle body is to be inspected, the base or the like of the vehicle body is measured to create a reference (plane). Then, the tilt can be inspected by determining the tilt of a plane obtained from measurements of the front and tail with respect to the reference, and comparing the tilt with a setting value.

In the present embodiment, the communication units 134A to 134D automatically transmit the spatial coordinate data measured by the three-dimensional shape measuring machines 102A to 102D to each other. The operators therefore do not need to copy or integrate the spatial coordinate data measured by the three-dimensional shape measuring machines 102A to 102D. In other words, the spatial coordinate data is automatically synthesized immediately after the measurement. Suppose, for example, that the measurement result of an arbitrary three-dimensional shape measuring machine 102A (102B to 102D) is unfavorable and needs to be discarded for remeasurement because of a difference in the skill level of the operators or due to the shape to be measured. Even in such cases, only the three-dimensional shape measuring machine 102A (102B to 102D) in question needs to perform remeasurement to complete the synthesis of the spatial coordinate data. This can reduce the evaluation time of the measurement result of the entire work W. Since the three-dimensional shape measuring machine 102A (102B to 102D) will not be moved a plurality of times for use, high position reproducibility can be achieved even during remeasurement. The spatial coordinate data on the remeasured zone is clearly identified by the measuring machine information (identification number). This eliminates the need to synthesize the entire spatial coordinate data again.

In the present embodiment, in order to measure the large work W, the four general-purpose (simplified) three-dimensional shape measuring machines 102A to 102D are installed so that a plurality of operators can simultaneously perform measurement. In other words, the measurement time of the large work W can be significantly reduced as compared to heretofore. Suppose that an expensive high-precision large-scale automatic measurement system utilizing industrial robots is used to measure the large work W. In such a case, all measurement programs used in the large-scale automatic measurement system need to be replaced if the work W is changed. The measurement programs also require an enormous amount of time and cost to test. As compared to such a large-scale automatic measurement system, the present embodiment allows quick measurement as a whole while maintaining considerable accuracy, with a significant reduction in cost (for example, $1/10$ to $1/2$).

In the present embodiment, the plurality of three-dimensional shape measuring machines 102A to 102D are arranged with their measurement ranges overlapping each other, and are simultaneously operated by respective different operators. The three-dimensional shape measuring machines 102A to 102D include the interference check units 140A to 140D which check the approaching state between the probes 104A to 104D, and the display units 142A to 142D which display check information determined by the interference check units 140A to 140D, respectively. As a result, a collision risk can be identified to individually and simultaneously warn the operators via the control PCs 130A to 130D. A possible collision between the three-dimensional shape measuring machines 102A to 102D can thus be avoided for improved measurement safety. More specifically, a collision risk due to adjoining three-dimensional shape measuring machines 102A to 102D coming too close to each other can be avoided without relying on the operators' attention, and the operators can concentrate on measurement at ease. For example, if one probe 104A measures the work W from inside (inside the body frame) and another probe 104B measures the work W from outside, the work W itself constitutes a wall to hinder mutual visibility. Even in such a case, the mutual warning display allows other operators to notify one who happens to be unaware of the warning display, whereby a possible collision can be avoided. However, this is not restrictive. The control PCs do not need to include the interference check units that check the approaching state between the probes, or the display units (or simple sound output units) that output the check information determined by the interference check units. For example, the probe heads of the three-dimensional shape measuring machines may include a proximity sensor so that the proximity sensors, when approaching each other, issue a warning by using sound, light, and/or vibrations without the intervention of the control PCs.

In the present embodiment, the synthesis units 138A to 138D determine corrected spatial coordinate data in the areas where the measurement ranges overlap, by using the stitching function on the basis of the mutually corresponding pieces of spatial coordinate data of the three-dimensional shape measuring machines 102A to 102D. The synthesis units 138A to 138D then synthesize the corrected spatial coordinate data. In the present embodiment, the stitching function can thus be used to evaluate the resulting spatial coordinate data without inconsistency. This is not restrictive, and the synthesis units do not need to have the stitching function. For example, the synthesis units may simply load the spatial coordinate data into one and the same (common) coordinate system without stitching. In such a case, for example, after all the spatial coordinate data are displayed on the display unit 142A, sampling including stitching, deletion, smoothing, noise reduction, and other error reduction analyses may be performed automatically or manually on the basis of the operator's decision or the like.

In the present embodiment, the control PCs 130A to 130D include the data acceptance units 132A to 132D in a stage prior to the synthesis units 138A to 138D. The data acceptance units 132A to 132D add the measurement flag to the spatial coordinate data when measuring the work W. The synthesis units 138A to 138D synthesize only the spatial coordinate data to which the measurement flag has been added. In other words, the addition of the measurement flag clearly indicates the spatial coordinate data to be synthesized. The synthesis itself can thus be performed efficiently. This is not restrictive, and the means are not limited to the data acceptance units that add the measurement flag. Any means may be used as along as whether the spatial coordinate data is measurement data can be determined at the synthesis stage.

In short, according to the present embodiment, a large work W exceeding the measurement range of a three-dimensional shape measuring machine 102A (102B to 102D) can be quickly measured at low cost.

In the present embodiment, the control PC 130A is assumed to include the coordinate data pool 136A and the synthesis unit 138A in hardware. However, the coordinate data pool 136A and the synthesis unit 138A may be implemented by using control software. More specifically, suppose that a plurality of three-dimensional shape measuring machines 102A to 102D of articulated arm type are arranged so that the measurement ranges of the probes 104A to 104D partly overlap each other to allow measurement of part or all of the work W, and configured such that each can output spatial coordinate data. In such a configuration, the control software may be configured to cause each of the control PCs 130A to 130D to perform the processing for retaining the spatial coordinate data in an identifiable manner with respect to each of the three-dimensional shape measuring machines 104A to 104D and the processing for synthesizing the retained spatial coordinate data.

While the present invention has been described in conjunction with the first embodiment thereof, the present invention is not limited to the first embodiment. It will be understood that improvements and design modifications may be made without departing from the gist of the present invention.

For example, in the first embodiment, the four three-dimensional shape measuring machines 102A to 102D are connected to the respective control PCs 130A to 130D. However, the present invention is not limited thereto. For example, as in a second embodiment shown in FIGS. 7 to 10, a plurality of three-dimensional shape measuring machines 202A to 202D may be connected to one control PC 230. Since the second embodiment differs from the first embodiment only in the control PC 230, the following description deals mainly with the control PC 230. A description of the other elements will be omitted.

Figure 7:
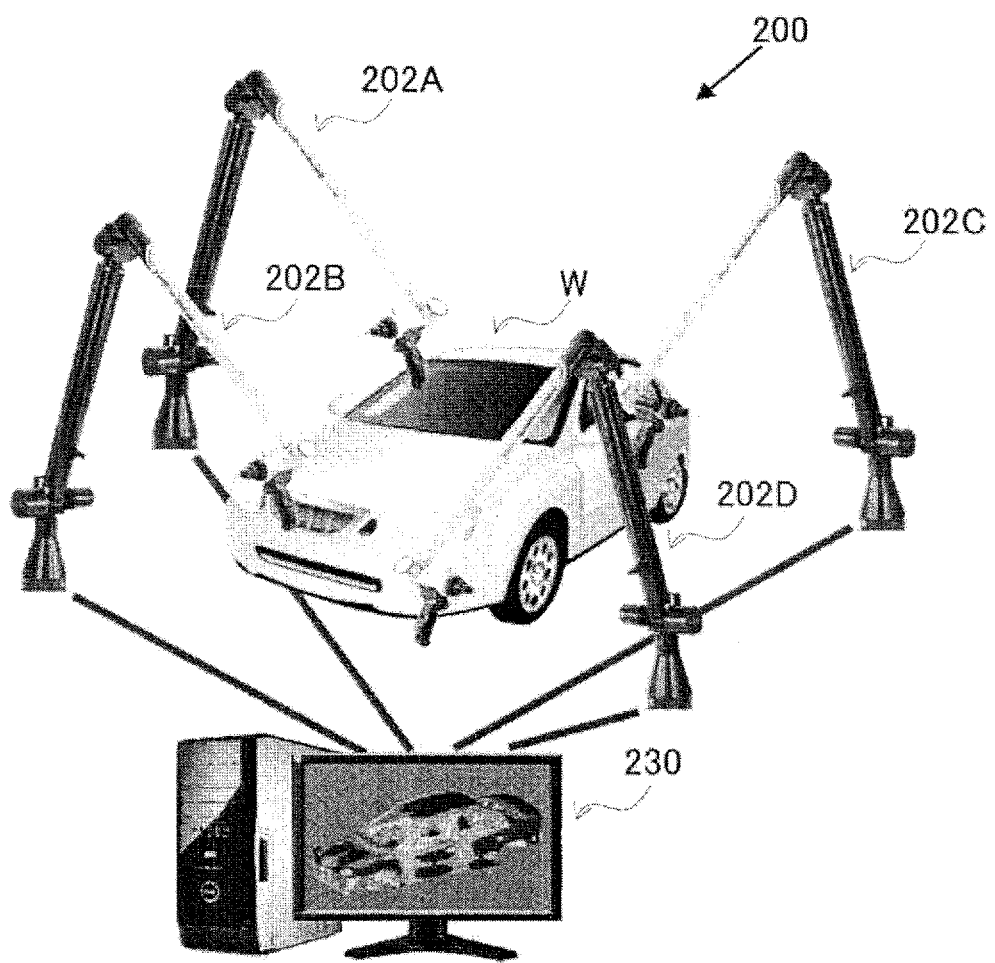
FIG. 7 is a schematic diagram showing an example of a three-dimensional shape measurement system according to a second embodiment of the present invention.

As shown in FIG. 7, a three-dimensional shape measurement system 200 according to the second embodiment includes four three-dimensional shape measuring machines 202A to 202D which are all connected to one control PC 230. In other words, the one control PC 230 successively synthesizes spatial coordinate data output from the four three-dimensional shape measuring machines 202A to 202D.

Figure 8:
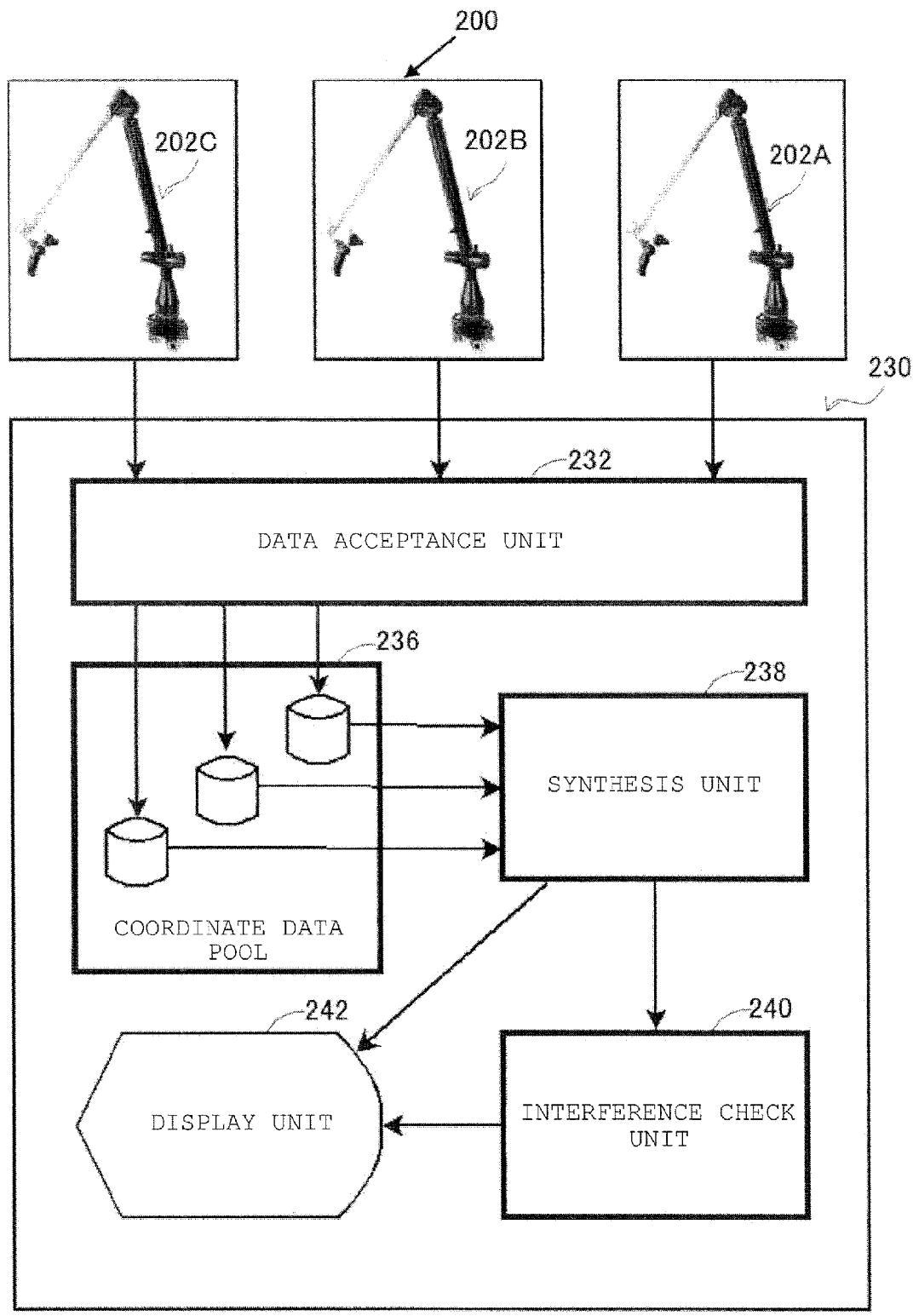
FIG. 8 is a schematic diagram showing an example of an entire block diagram of FIG. 7.

As shown in FIG. 8, the control PC 230 includes a data acceptance unit 232, a coordinate data pool 236, a synthesis unit 238, an interference check unit 240, and a display unit 242. The three-dimensional shape measuring machine 202D is omitted in FIG. 8. Unlike the first embodiment, the present embodiment includes no communication unit. The spatial coordinate data from all the three-dimensional shape measuring machines 202A to 202D is input to the data acceptance unit 232. Since the data acceptance unit 232, the coordinate data pool 236, the synthesis unit 238, the interference check unit 240, and the display unit 242 have the same functions as in the first embodiment, a description thereof will be omitted.

Figure 9:
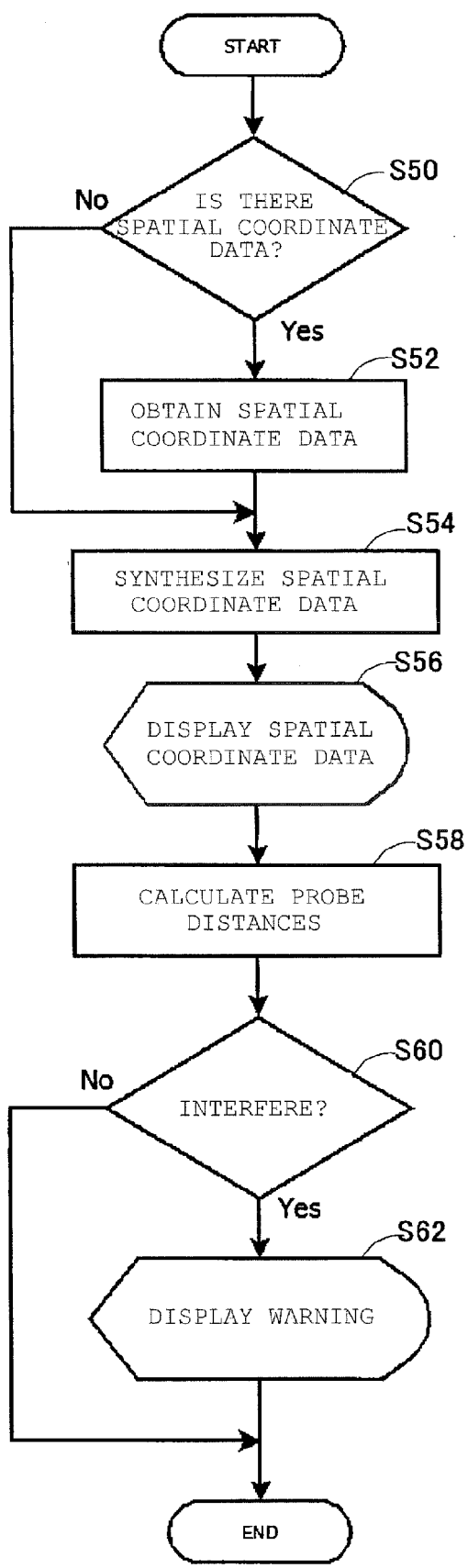
FIG. 9 is a flowchart corresponding to FIG. 4, showing a procedure of main processing of spatial coordinate data by the control computer of FIG. 7.
Figure 10:
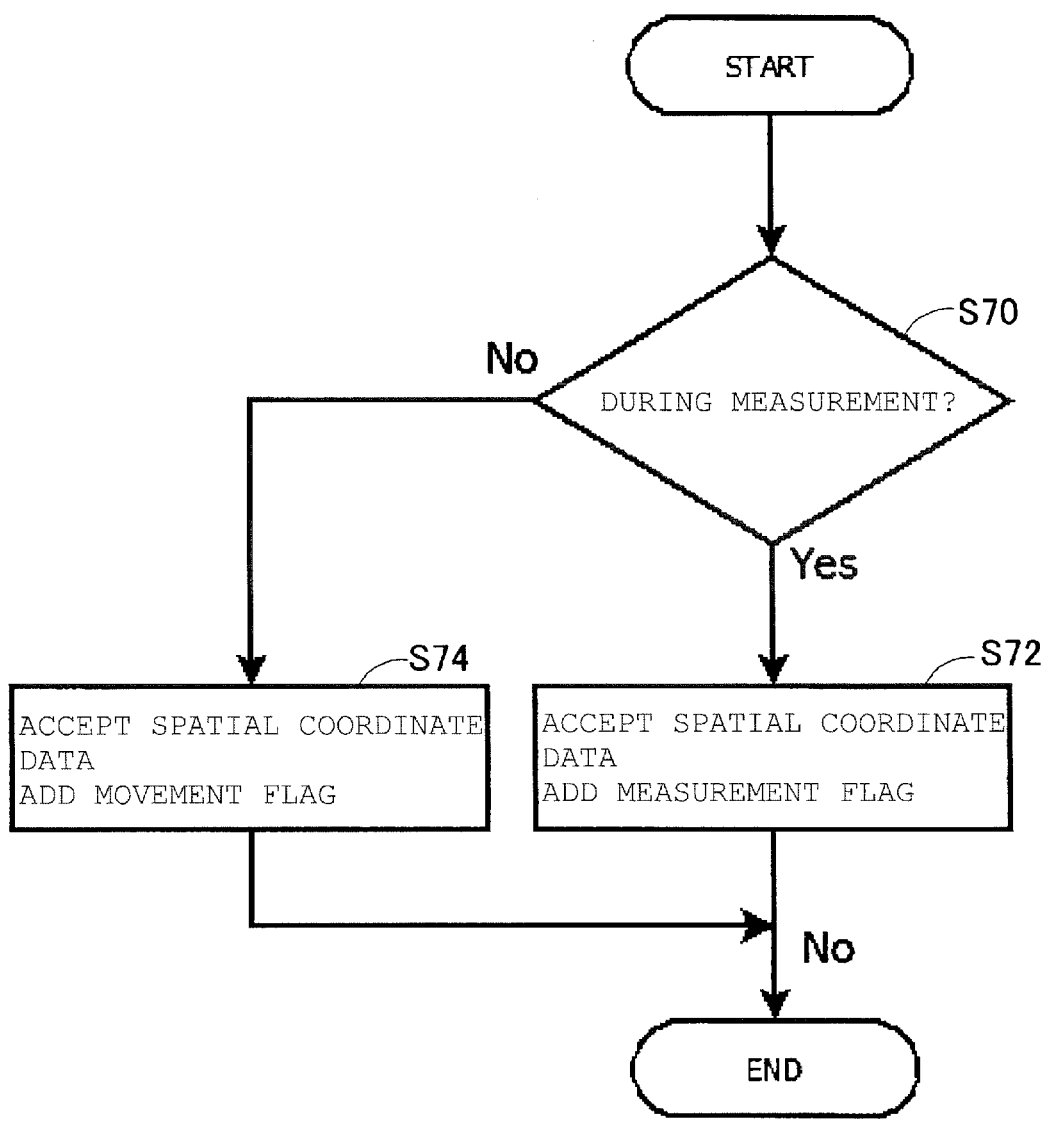
FIG. 10 is a flowchart corresponding to FIG. 6, mainly showing a procedure of processing in a stage still prior to the main processing shown in FIG. 9.

Next, an example of processing procedures to be performed by the control PC 230 of the three-dimensional shape measurement system 200 according to the present embodiment will be described below with reference to FIGS. 9 and 10. FIG. 9 shows processing that is mainly performed by the coordinate data pool 236, the synthesis unit 238, the interference check unit 240, and the display unit 242 of FIG. 8. FIG. 10 shows processing that is mainly performed by the data acceptance unit 232. Such processing procedures are simultaneously performed by parallel processing (multitask processing).

The processing of FIG. 10 will be initially described. This processing is performed when the data acceptance unit 232 is requested to accept spatial coordinate data.

Initially, the data acceptance unit 232 determines whether the spatial coordinate data input to the data acceptance unit 232 is measurement data on the work W.

If the spatial coordinate data is measurement data on the work W (Yes in step S70), the data acceptance unit 232 accepts the spatial coordinate data and adds the measurement flag to the spatial coordinate data (step S72). If the spatial coordinate data is not measurement data on the work W but output data when the probes 204A to 204D are simply being moved (No in step S70), the data acceptance unit 232 accepts the spatial coordinate data and adds the movement flag to the spatial coordinate data (step S74). In either case, the spatial coordinate data is configured such that the measuring machine information about the three-dimensional shape measuring machines 202A to 202D can be recognized.

Next, the processing of FIG. 9 will be described. This processing is performed faster than the output intervals of the spatial coordinate data output from the three-dimensional shape measuring machines 202A to 202D.

Initially, the control PC 230 determines whether there is spatial coordinate data of the probes 204A to 204D in the coordinate data pool 236. If there is spatial coordinate data of the probes 204A to 204D (Yes in step S50), the control PC 230 obtains and loads the spatial coordinate data into a memory of the synthesis unit 238.

Next, the synthesis unit 238 simultaneously analyzes all the spatial coordinate data loaded in its memory, and synthesizes only spatial coordinate data to which the measurement flag has been added (step S54) (the processing proceeds to the same step if there is no spatial coordinate data of the probes 204A to 204D). Using the stitching function, the synthesis unit 238 determines corrected spatial coordinate data in the areas where the measurement ranges overlap, on the basis of the mutually corresponding pieces of spatial coordinate data of the three-dimensional shape measuring machines 202A to 202D. The synthesis unit 238 synthesizes the corrected spatial coordinate data into one and the same coordinate system. In areas where the measurement ranges (zones) do not overlap, the synthesis unit 238 simply synthesizes the spatial coordinate data into the same coordinate system.

Next, the display unit 242 displays the synthesized spatial coordinate data (step S56). Here, the movement-flagged spatial coordinate data is displayed separately from the synthesized spatial coordinate data (or need not be displayed). For example, the movement-flagged spatial coordinate data may be displayed as moving tracks of the probes 204A to 204D. The synthesized (measurement-flagged) spatial coordinate data may be displayed in different display modes (in different display colors etc.) according to the different measuring machine information.

Next, the interference check unit 240 calculates the distances between the probes 204A to 204D (step S58). Next, the interference check unit 240 determines whether the calculated distances are smaller than a setting distance. If a calculated distance is smaller than the setting distance (Yes in step S60), the display unit 242 displays a warning display (step S62). For example, the warning display may be implemented by changing the display mode (such as blinking and reversing display) of only the portions that may cause interference. It should be appreciated that an alarm and the like may be issued along with the warning display. In addition to such a warning display, the electromagnetic brakes of the three-dimensional shape measuring machines 202A to 202D may be controlled to regulate the movement of the three-dimensional shape measuring machines 202A to 202D. If the calculated distances are greater than the setting distance (No in step S60), the interference check unit 240 ends the processing without a warning display.

As described above, in the present embodiment, all the three-dimensional shape measuring machines 202A to 202D are connected to one control PC 230. As compared to the foregoing first embodiment, a larger work W can thus be more quickly measured at lower cost.

In the foregoing embodiments, the probes are ball probes. The present invention is not limited thereto, and the probes may be contact probes such as a touch signal probe. Alternatively, the probes may be noncontact probes using a line laser or the like.

In the foregoing embodiments, the three-dimensional shape measuring machines include respective input units. However, the input units are not indispensable. All the processing may be configured to be performed by reading data stored in the storage units of the processing units. In such a case, stop instructions may be automatically issued by the control PC(s).

In the foregoing embodiments, the stitching function may include simply adjusting heights to each other. The stitching function may be implemented by configuring respective virtual planes and matching the virtual planes by using a least squares method.

The present invention may be widely applied to a three-dimensional shape measurement system including a plurality of three-dimensional shape measuring machines of articulated arm type that output spatial coordinate data on probes for measuring a work and a processing unit or units that process(es) the spatial coordinate data.

It should be apparent to those skilled in the art that the above-described exemplary embodiments are merely illustrative which represent the application of the principles of the present invention. Numerous and varied other arrangements can be readily devised by those skilled in the art without departing from the spirit and the scope of the invention.

The invention claimed is:

1. A three-dimensional shape measurement system comprising a three-dimensional shape measuring machine that outputs spatial coordinate data on a probe for measuring a work, and a processing unit that processes the spatial coordinate data,
    the three-dimensional shape measurement machine comprising a plurality of three-dimensional shape measuring machines of articulated arm type that are arranged so that measurement ranges of the probes overlap each other to allow measurement of part or all of the work and configured such that each can output the spatial coordinate data,
    the processing unit comprising retaining means for retaining the spatial coordinate data in an identifiable manner with respect to each of the three-dimensional shape measuring machines, and synthesizing means for synthesizing the spatial coordinate data retained by the retaining means.

2. The three-dimensional shape measurement system according to claim 1, wherein the processing unit further comprises interference checking means for checking an approaching state between the probes on the basis of the spatial coordinate data, and outputting means for outputting check information determined by the interference checking means.

3. The three-dimensional shape measurement system according to claim 2, wherein the check information is a collision warning.

4. The three-dimensional shape measurement system according to claim 3, wherein the collision warning is output to all the three-dimensional shape measuring machines.

5. The three-dimensional shape measurement system according to claim 1, wherein the synthesizing means determines corrected spatial coordinate data in an area where the measurement ranges overlap, on the basis of the mutually corresponding pieces of spatial coordinate data of the three-dimensional shape measuring machines, and synthesizes the corrected spatial coordinate data.

6. The three-dimensional shape measurement system according to claim 1, wherein
    the processing unit comprises data accepting means for adding a measurement flag to the spatial coordinate data when the work is being measured, the data accepting means being arranged in a stage prior to the synthesizing means, and
    the synthesizing means synthesizes only the spatial coordinate data to which the measurement flag is added.

7. The three-dimensional shape measurement system according to claim 6, wherein the data accepting means adds a movement flag when the probe is simply moving.

8. The three-dimensional shape measurement system according to claim 1, wherein the processing unit comprises a plurality of the processing units arranged to correspond to the respective three three-dimensional shape forming machines.

9. The three-dimensional shape measurement system according to claim 1, wherein the processing unit is one and common to the three-dimensional shape measuring machines.

10. A software for controlling a three-dimensional shape measurement system, the three dimensional shape measurement system comprising a three-dimensional shape measuring machine that outputs spatial coordinate data on a probe for measuring a work, and a processing unit that processes the spatial coordinate data,
    the three-dimensional shape measurement machine comprising a plurality of three-dimensional shape measuring machines of articulated arm type that are arranged so that measurement ranges of the probes overlap each other to allow measurement of part or all of the work and configured such that each can output the spatial coordinate data,
    the software being configured to cause the processing unit to perform processing for retaining the spatial coordinate data in an identifiable manner with respect to each of the three-dimensional shape measuring machines, and processing for synthesizing the retained spatial coordinate data.

* * * * *